United States Patent
Kamis et al.

(10) Patent No.: US 11,268,549 B2
(45) Date of Patent: Mar. 8, 2022

(54) HYDRAULIC ACTUATOR EQUIPPED WITH AN END-OF TRAVEL SLOWING DEVICE

(71) Applicant: SAFRAN LANDING SYSTEMS, Velizy-Villacoublay (FR)

(72) Inventors: Jean-Baptiste Kamis, Moissy-Cramayel (FR); Jean-Charles Roger, Moissy-Cramayel (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 0 days.

(21) Appl. No.: 16/872,857

(22) Filed: May 12, 2020

(65) Prior Publication Data
US 2020/0362887 A1    Nov. 19, 2020

(30) Foreign Application Priority Data
May 13, 2019   (FR) ...................................... 19 04966

(51) Int. Cl.
  *F15B 15/22* (2006.01)
  *B64C 25/22* (2006.01)
  *F01B 11/02* (2006.01)

(52) U.S. Cl.
  CPC ............ *F15B 15/223* (2013.01); *B64C 25/22* (2013.01); *F01B 11/02* (2013.01); *F15B 15/22* (2013.01); *F15B 15/227* (2013.01)

(58) Field of Classification Search
  CPC .............................. F15B 15/227; F15B 15/223
  See application file for complete search history.

(56) References Cited

U.S. PATENT DOCUMENTS 2,553,810 A    5/1951   Carlson
3,067,726 A  * 12/1962  Williams .............. F15B 15/223
                                                  91/395

(Continued)

FOREIGN PATENT DOCUMENTS

EP    3 150 863 A1    4/2017
FR      633.581 A     1/1928

OTHER PUBLICATIONS

French Preliminary Search Report for 19 04966 dated Jan. 9, 2020.

*Primary Examiner* — F Daniel Lopez
(74) *Attorney, Agent, or Firm* — Sughrue Mion, PLLC

(57) ABSTRACT

The invention relates to a hydraulic actuator comprising a cylinder (1) in which a piston (2) secured to a rod (4) is mounted so as to slide in a sealed manner in order to delimit in the cylinder a hydraulic extension chamber (5) and a hydraulic retraction chamber (6) that are connected to respective ports, the hydraulic actuator comprising means for slowing the piston when the piston approaches a retracted position. According to the invention, the slowing means comprise first and second hydraulic lines (7, 8) extending between the extension port and the extension chamber, the first hydraulic line comprising a seat (13) while the piston bears a retractable finger (10) having an end (14) that comes to bear against the seat in order to close the first hydraulic line (7) when the piston approaches the retracted position, such that only the second hydraulic line (8) remains open while the piston completes its travel towards the retracted position.

Landing gear and aircraft comprising such an actuator.

12 Claims, 3 Drawing Sheets

(56) References Cited

U.S. PATENT DOCUMENTS

| | | | | |
|---|---|---|---|---|
| 4,043,787 A | * | 8/1977 | Foster | F15B 15/223 |
| | | | | 65/227 |
| 4,138,928 A | | 2/1979 | Pilch | |
| 2017/0363120 A1 | * | 12/2017 | Stander | F15B 15/227 |

* cited by examiner

[Fig. 1]
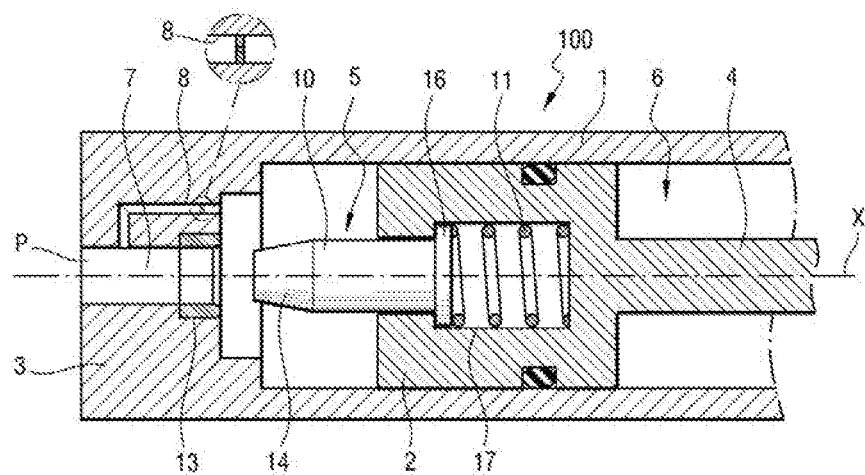
[Fig. 2]
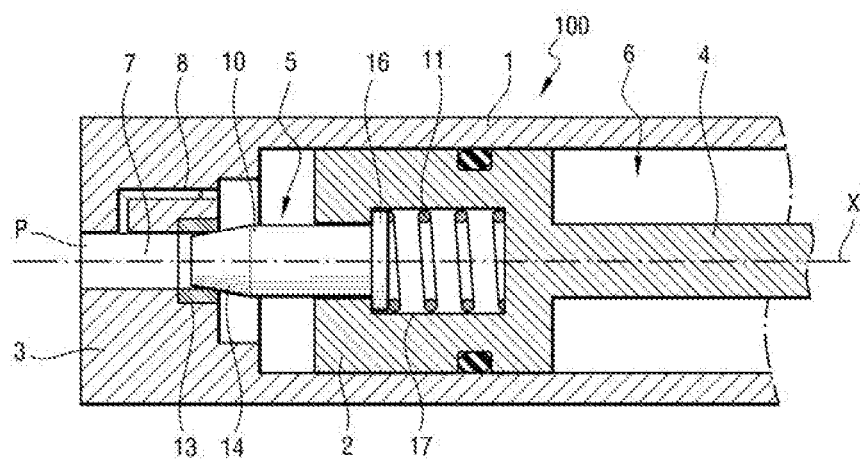

[Fig. 3]
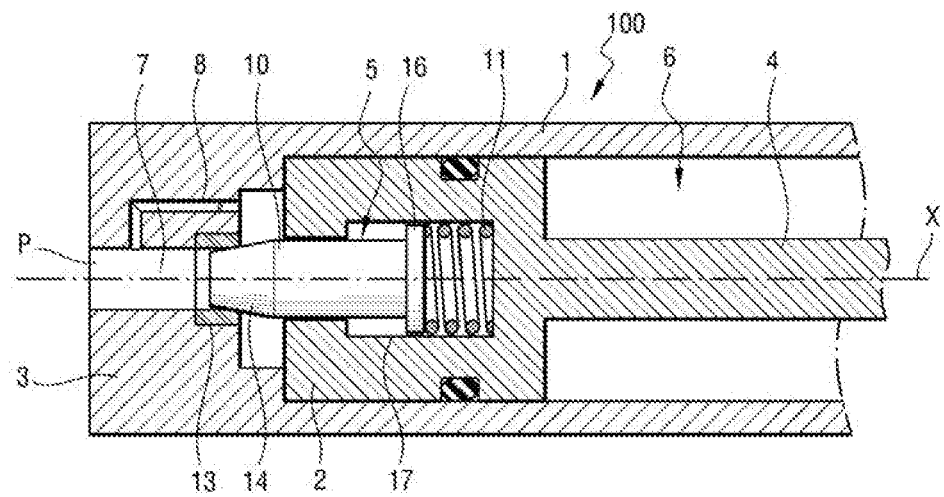
[Fig. 4]
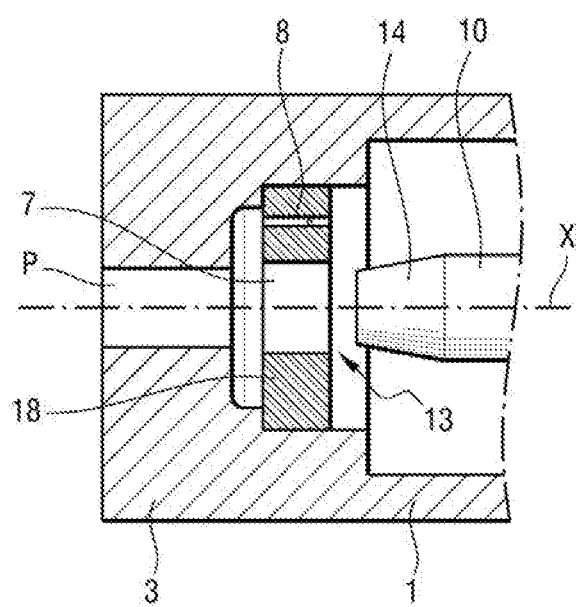

[Fig. 5]
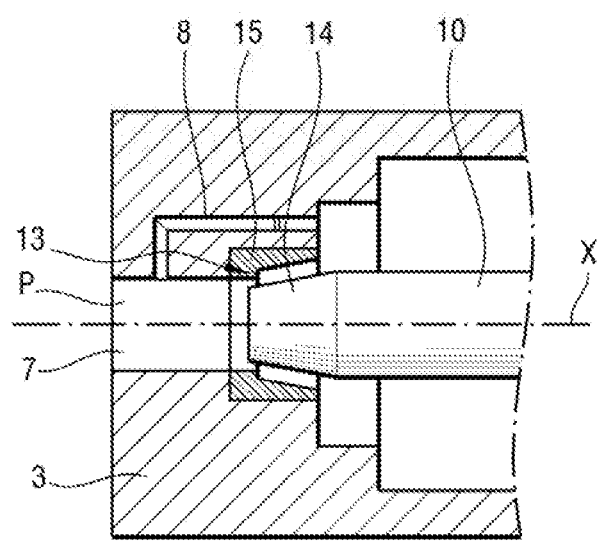

HYDRAULIC ACTUATOR EQUIPPED WITH AN END-OF TRAVEL SLOWING DEVICE

BACKGROUND OF THE INVENTION

Hydraulic actuators that are used in particular for manoeuvring landing gear of aircraft, comprising a cylinder in which a piston is mounted so as to slide, are known. The piston delimits in the cylinder a hydraulic extension chamber and a hydraulic retraction chamber that are connected to a hydraulic circuit by respective ports. This type of actuator can be equipped with an end-of-travel slowing device for slowing the movement of the rod during retraction of the rod on approaching the stop. To this end, the port associated with the extension chamber opens out at the end wall of a cavity formed in the end of the cylinder. The rod has a protrusion which, on approaching the end-of-travel stop, slots precisely into the cavity, forcing the fluid still contained in the extension chamber to flow through the annular space left between the protrusion and the wall of the cavity, causing an increase in pressure in the extension chamber that brakes the piston and helps to slow the rod before it arrives at the stop.

This slowing device requires a high level of machining precision and finely calibrated functional clearances. It is also sensitive to temperature variations since the annular flow is essentially laminar while it is turbulent at high temperatures, bringing about a significant variation in the damping factor.

OBJECT OF THE INVENTION

The object of the invention is to propose a telescopic hydraulic actuator equipped with means for slowing the rod at the end of travel that are simple to implement and not very temperature sensitive.

SUMMARY OF THE INVENTION

In order to realize this function, a hydraulic actuator is proposed, comprising a cylinder in which a piston secured to a rod is mounted so as to slide in a sealed manner in order to delimit in the cylinder a hydraulic extension chamber and a hydraulic retraction chamber that are connected to respective ports, the hydraulic actuator comprising means for slowing the piston when the piston approaches a retracted position. According to the invention, the slowing means comprise first and second hydraulic passages extending from the extension port to the extension chamber, the first hydraulic passage comprising a seat while the piston bears a retractable finger having an end that comes to bear against the seat in order to close the first hydraulic passage when the piston approaches the retracted position, such that only the second hydraulic passage remains open while the piston completes its travel towards the retracted position.

Thus, when the finger comes to bear against the seat, the first hydraulic passage is closed and the fluid is forced to flow through the second passage, thereby reducing the flow cross section for the fluid and thus exerting a resistance that slows the piston completing its travel towards the retracted position. The finger thus retracts gradually into the piston during the movement of the latter, while remaining in abutment against the seat.

This arrangement is very simple to implement and does not require the execution of precise functional clearances. It is enough to allow the finger to float transversely so as to allow it to centre itself in the seat and to ensure closure which, if not sealed, is at least great enough to, in practice, force the fluid to pass through the second passage.

According to a particular arrangement of the invention, the hydraulic passages extend in an end wall of the cylinder. Thus, preferably, the seat is attached to the end wall of the cylinder.

Alternatively, the hydraulic passages are provided in a fitted insert or in a calibrated hole in the end wall of the cylinder.

Preferably, the finger is mounted on the piston so as to slide along a central axis of the cylinder.

According to another particular arrangement of the invention, the end of the finger is conical so as to allow better guidance.

The finger is retractable counter to the action of return means that push the finger towards a position protruding from the piston. A drain is also provided in the body to avoid trapping the pressure between the rod and the body of the retractable finger.

According to yet another particular arrangement of the invention, the seat is preceded by a ferrule intended to cooperate with the end of the finger before the latter comes to bear against the seat in order to gradually reduce a flow cross section of the first hydraulic passage and to allow (conical or circular) centring.

BRIEF DESCRIPTION OF THE DRAWINGS

The invention will be understood better in the light of the following description of the figures of the appended drawings, in which:

FIG. 1 is a schematic cross-sectional view of a hydraulic actuator provided with a slowing device according to the invention, illustrated when the piston is approaching the retracted position, the end of the finger not yet bearing against the seat;

FIG. 2 is a view similar to the one in FIG. 1, the same actuator being illustrated at the moment the end of the finger comes into contact with the seat;

FIG. 3 is a view similar to the one in FIG. 1, the same actuator being illustrated at the moment the piston arrives in the retracted position;

FIG. 4 illustrates an embodiment variant of the actuator in FIG. 1, in which the second end wall receives a insert in which the two hydraulic passages are provided;

FIG. 5 shows a seat with which the actuator in FIG. 1 or FIG. 4 can be equipped, the seat being joined to an inlet ferrule that cooperates with the end of the finger so as to gradually close a flow cross section of the first passage.

DETAILED DESCRIPTION OF THE INVENTION

With reference to FIGS. 1 to 3, the invention applies to a hydraulic actuator 100 comprising a hollow cylinder 1 in which a piston 2 is mounted so as to slide along a longitudinal axis X, in this case the central axis of the cylinder 1. The cylinder is delimited on either side by a first end wall (not visible here), through which a rod 4 secured to the piston 2 passes, and a second end wall 3, which is visible here. The piston 2 delimits in the cylinder 1 a hydraulic extension chamber 5 and a hydraulic retraction chamber 6. The extension chamber is in this case connected to an extension port P.

According to the invention, the extension port P is connected to the extension chamber 5 by a first hydraulic passage 7 with a large enough diameter to only bring about minor pressure losses, and a second hydraulic passage 8 with a smaller diameter, voluntarily forming a constriction for the passage of the fluid.

Furthermore, the piston 2 bears a finger 10 mounted on the piston 2 so as to slide, in this case along the longitudinal axis X, counter to the action of a spring 11 that returns the finger towards a protruding position defined by the cooperation of a flange 16 protruding from an end portion of the finger 10 with a shoulder of a cavity 17 of the piston 2 that holds the spring 11 and said end portion of the finger 10. The first hydraulic passage 7 comprises a seat 13 attached to the second end wall 3 and disposed facing a conical end 14 of the finger 10. The finger 10, the spring 11, the seat 13, and the two hydraulic passages 7, 8 together form the slowing device of the invention, the functioning of which will now be described in detail.

When pressurized fluid is admitted into the retraction chamber 6, the piston 2 moves towards the second end wall 3. As long as the piston 2 is at a distance from the second end wall 3, as illustrated in FIG. 1, the end 14 of the finger 10 is spaced apart from the seat 13 and the fluid present in the extension chamber 5 is expelled from the latter towards the port P via the first hydraulic passage 7.

As the piston 2 continues its travel, the end 14 of the finger 10 comes to bear against the seat 13, as illustrated in FIG. 2, thereby closing the first hydraulic passage 7 and forcing the fluid to flow via the second hydraulic passage 8. The second hydraulic passage 8 comprises a localized cross-sectional constriction such that the flow of the fluid through the second hydraulic passage 8 causes an increase in pressure in the extension chamber 5 that helps to slow the piston 2. It will be noted that such flow occurs under turbulent conditions. The orifice forming the localized cross-sectional constriction, which is in this case pierced through a thin plate mounted transversely in the hydraulic passage (said plate being indicated only in FIG. 1), will make it possible to increase the speed of the fluid and will generate turbulence, such that the resistance that it generates is not very sensitive to the temperature of the fluid. It is absolutely necessary for the plate in which the orifice is made to have as small a thickness as possible in order to obtain what is known as "thin wall" flow.

The piston 2 then continues its travel at a reduced speed as far as the retracted position illustrated in FIG. 3, the fluid then flowing only through the second hydraulic passage 8. The spring 11 ensures that the end 14 of the finger 10 bears against the seat 13 such that the first hydraulic passage 7 remains closed, while allowing the retraction of the finger 10 into the piston 2.

In order to ensure proper closure of the first hydraulic passage 7, all that is necessary is to provide axial guidance of the finger 10 in the piston 2 in a sufficiently floating manner to allow the end 14 of the finger 10 to centre itself in the seat 13. In practice, an end 14 that is long enough to facilitate this self-centring will be provided. The calibration of the constriction provided in the second hydraulic passage 8 can be obtained by a hole with a calibrated diameter in this second passage, or by the use of a suitable constrictor. It is appropriate to allow easy evacuation of the fluid contained in the cavity 17 during the retraction of the finger 10, in order to avoid an increase in the pressure of the fluid in the cavity 17, which could cause a damping phenomenon resisting the retraction of the finger 10. Similarly, it is appropriate to calibrate the stiffness of the spring 11 to ensure that the end 14 of the finger 10 bears properly against the seat 13, without otherwise generating a shock upon contact, which would prematurely wear the seat 13.

When it is necessary to withdraw the rod 4, pressurized fluid is admitted through the extension port P. The fluid pushes the finger 10 back counter to the action of the spring 11, such that the fluid can pass into the extension chamber through the first hydraulic passage 7.

According to an embodiment variant illustrated in FIG. 4, the first hydraulic passage 7 and the second hydraulic passage 8 are provided in an insert 18 fitted in the second end wall 3 of the cylinder 1. The seat 13 is then made up simply of the ridge delimiting the edge of the first hydraulic passage 7 facing the end 14 of the finger 10. Thus, precision machining operations (creation of the hydraulic passages 7 and 8) can be carried out on a separate part, made of a suitable material (for example bronze). Of course, a separate seat can be mounted on the insert 18, in a similar manner to the actuator in FIGS. 1 to 3.

According to another embodiment variant that is illustrated in FIG. 5, the seat 13 is preceded by a ferrule 15, which can, as illustrated here, be integral with the seat 13, and which has the function of cooperating with the end 14 of the finger 10 in order to gradually reduce a flow cross section for the fluid through the first hydraulic passage 7 before the end 14 comes to bear against the seat 13 and closes the passage, in order to reduce or eliminate pressure surges during the closure of the first hydraulic passage 7. Here, the ferrule 15 has a conical internal shape, but any other suitable shape for gradually closing the first hydraulic passage 7 can be used. The conical internal shape of the ferrule 15 thus has a circular flow cross section that decreases towards the seat along a gradual slope.

The gradual slope makes it possible to limit the speed of the piston, by creating gradual damping, and thus the increase in pressure in the main extension chamber when the sliding piston arrives on the seat contained in the bearing. The flow of the fluid thus decreases more gradually than when there is no slope.

Advantageously, the internal shape of the ferrule is designed to also guide the finger. Effectively, the dimensional tolerances of several parts need to be taken into account to ensure that the finger arrives on the seat. Such a shape makes it possible to reduce machining uncertainties and the accuracy classes required for machining the parts. The slope and the seat will preferably be provided in the same part in order to allow better control of the sliding, the guidance and especially the sealing.

Once the finger is bearing on the seat, the fluid is forced to pass via the insert, the hydraulic diameter of which is small, creating turbulent flow, as in a thin wall orifice.

The invention is not limited to what has just been described, but rather encompasses any variant that falls within the scope defined by the claims.

In particular, although the finger is in this case disposed on the piston in order to slide and retract along the longitudinal axis X, the finger could be disposed so as to slide along any other axis parallel to the longitudinal axis X.

Although in this case the finger 10 has a conical end 14, this end could be given any shape that is able to cooperate with the facing seat in order to close the first hydraulic passage 7.

The cross-sectional constriction may be machined into the body of the cylinder or the insert, or be added thereto.

The actuator of the invention is particularly advantageous for use in aircraft landing gear, in particular for manoeuvring this landing gear between the down position and the up position of the landing gear. The actuator of the invention can also be used as an actuator for moving a movable element with respect to a fixed element of an aircraft, for example a movable flight surface, a fairing of a thrust reverser, etc. Nevertheless, other applications of the actuator of the invention are conceivable, for example as an actuator on ships or terrestrial motor vehicles.

The invention claimed is:

1. A hydraulic actuator comprising:
   a cylinder in which a piston secured to a rod is mounted so as to slide in a sealed manner in order to delimit in the cylinder a hydraulic extension chamber and a hydraulic retraction chamber that are connected to respective extension and retraction ports, the hydraulic actuator comprising slowing means for slowing the piston when the piston approaches a retracted position,
   wherein the slowing means comprise first and second hydraulic passages connecting the extension port and the extension chamber, the first hydraulic passage comprising a seat while the piston bears a retractable finger having an end that comes to bear against the seat in order to close the first hydraulic passage when the piston approaches the retracted position, such that only the second hydraulic passage remains open while the piston completes its travel towards the retracted position, and
   wherein the seat is preceded by an internal shape of a ferrule intended to cooperate with the end of the retractable finger before the retractable finger comes to bear against the seat in order to gradually reduce a flow cross section of the first hydraulic passage.

2. The hydraulic actuator according to claim 1, wherein the seat and the ferrule are in one piece.

3. The hydraulic actuator according to claim 1, wherein the internal shape of the ferrule is designed to also guide the retractable finger.

4. The hydraulic actuator according to claim 1, wherein the first and second hydraulic passages extend in an end wall of the cylinder.

5. The hydraulic actuator according to claim 4, wherein the seat is attached to the end wall of the cylinder.

6. The hydraulic actuator according to claim 1, wherein the retractable finger is mounted on the piston so as to slide along a central axis of the cylinder.

7. The hydraulic actuator according to claim 1, wherein the end of the retractable finger is conical.

8. The hydraulic actuator according to claim 1, wherein the retractable finger is retractable counter to the action of return means that push the retractable finger towards a position protruding from the piston.

9. A landing gear comprising an actuator for manoeuvring the landing gear between an up position and a down position, wherein the actuator comprises the hydraulic actuator according to claim 1.

10. An aircraft comprising landing gear according to claim 9.

11. The hydraulic actuator according to claim 1, wherein the internal shape of the ferrule is a conical internal shape having a circular cross section that decreases towards the seat along a gradual slope.

12. The hydraulic actuator according to claim 1, wherein the conical internal shape extends to the seat.

* * * * *